United States Patent [19]

ElDifrawi

[11] 4,266,404
[45] May 12, 1981

[54] METHOD AND APPARATUS FOR CONSERVING WASTE ENERGY

[75] Inventor: Ahmed A. ElDifrawi, Westmont, Ill.

[73] Assignee: Letcher T. White, Manchester, Ky.

[21] Appl. No.: 63,691

[22] Filed: Aug. 6, 1979

[51] Int. Cl.³ .......................... F25B 7/00; F25B 27/02
[52] U.S. Cl. ........................................ 62/79; 62/238.4
[58] Field of Search .................. 62/238 C, 79

[56] References Cited

U.S. PATENT DOCUMENTS

| | | | |
|---|---|---|---|
| 1,151,035 | 8/1915 | Norton | 62/232 |
| 1,511,890 | 10/1924 | Karge | 62/144 |
| 1,833,901 | 12/1931 | Hull | 62/335 |
| 2,024,083 | 12/1935 | Young | 62/106 |
| 2,783,622 | 3/1957 | Bourassa | 62/119 |
| 2,991,632 | 7/1961 | Rogers | 62/238 C |
| 3,270,512 | 9/1966 | Webb | 62/2 |
| 3,470,707 | 10/1969 | Lofgreen et al. | 62/196 |
| 3,823,573 | 7/1974 | Cassady | 62/238 C |
| 3,828,566 | 8/1974 | Wetzel | 62/143 |
| 4,164,850 | 8/1979 | Lowi, Jr. | 62/238 C |

*Primary Examiner*—Lloyd L. King
*Attorney, Agent, or Firm*—Stanley J. Price, Jr.; John M. Adams

[57] ABSTRACT

A method and apparatus for conserving waste energy by transferring waste heat from an internal combustion engine, solar energy or from any other source of waste heat energy of a temperature of 200° F. or above to a carrier liquid includes conveying the heated carrier liquid to a heat exchanger, pressurizing a refrigerant by heating the refrigerant with heat energy extracted from the heated carrier liquid and performing work with the pressurized refrigerant. The preferred embodiments include a modified Rankine-Sterling cycle engine and a dual absorption generator system.

29 Claims, 6 Drawing Figures

METHOD AND APPARATUS FOR CONSERVING WASTE ENERGY

BACKGROUND OF THE INVENTION

1. Field of the Invention

This invention relates to converting waste heat into useful energy and, in particular, to utilizing waste heat from an internal combustion engine to perform work, such as air conditioning an automobile or operating a pump or other mechanical device.

2. Description of the Prior Art

It is well recognized that in recent years considerable attention has been given to conserving waste heat by converting it into useful work. While a great number of concepts have been proposed to meet this need, only a very few have been found to be practical.

One such concept that has been proposed is disclosed in U.S. Pat. No. 2,944,407. In accordance with that patent, apparatus that includes the use of dual absorption generators is suggested for converting the heat from the exhaust gases of an internal combustion engine into useful refrigeration. While the concept of the patent, of course, is a valid one, the specific apparatus disclosed is fraught with potential mechanical problems, whether adopted for use on a vehicle or in another environment. The apparatus is composed of a plurality of springs, levers, mechanical valves, turbine-blower fans and other mechanical appurtenances that may readily wear or malfunction causing operational failure. Moreover, the apparatus is proposed for operation by the exhaust gases of an internal combustion engine, gases that are known to be corrosive. These exhaust gases are conveyed throughout a container box housing the dual absorption generators and the various mechanical devices mentioned above. Accordingly, if corrosion doesn't cause malfunction of the mechanical devices, due to their direct exposure to the exhaust gases, it can be anticipated that in time, corrosion of the housing and that contained therein will naturally occur, requiring total replacement of this portion of the system.

It will be apparent from the foregoing that a need exists for improvements in apparatus designed to operate on waste heat from an internal combustion engine in order to produce useful work. In particular, it should be apparent that, among other features, such apparatus should not be unduly subject to corrosive failure and, if mechanical devices are required for its operation, they should be minimized or at least chosen for their simplicity and known low incidence of failure.

SUMMARY OF THE INVENTION

In accordance with this invention, there is provided a method and apparatus for conserving waste energy by transferring waste heat from an internal combustion engine to a carrier liquid, conveying the heated carrier liquid to a heat exchanger, pressurizing a refrigerant by heating the refrigerant with heat energy extracted from the heated carrier liquid and performing work with the pressurized refrigerant.

The apparatus employed with this invention includes in one embodiment the use of a modified Rankine-Sterling cycle engine and in another embodiment dual absorption generators. Both are characterized by including means to transfer waste heat from an internal combustion engine to a carrier liquid and means to convey the heated carrier liquid to heat exchanger means. In addition, both systems include heat exchanger means to pressurize a refrigerant by heating the refrigerant with heat energy extracted from the heater carrier liquid. Also, in both types of apparatus, means are provided to perform work with the pressurized refrigerant.

A feature of this invention is that neither the modified Rankine-Sterling cycle engine herein disclosed nor the dual absorption generator system disclosed are susceptible to corrosive failure over an extended period of use.

Another feature is that the modified Rankine-Sterling cycle engine of this invention is composed of mechanical parts that are chosen for their long life, failure-free characteristics.

An additional feature of this invention is that the dual generator absorption system disclosed is devoid of moving parts other than a simple control valve.

These and other objects, features and advantages of this invention will become more apparent from the following disclosure, the drawings and the appended claims.

DESCRIPTION OF THE PREFERRED EMBODIMENTS

Figure 1:
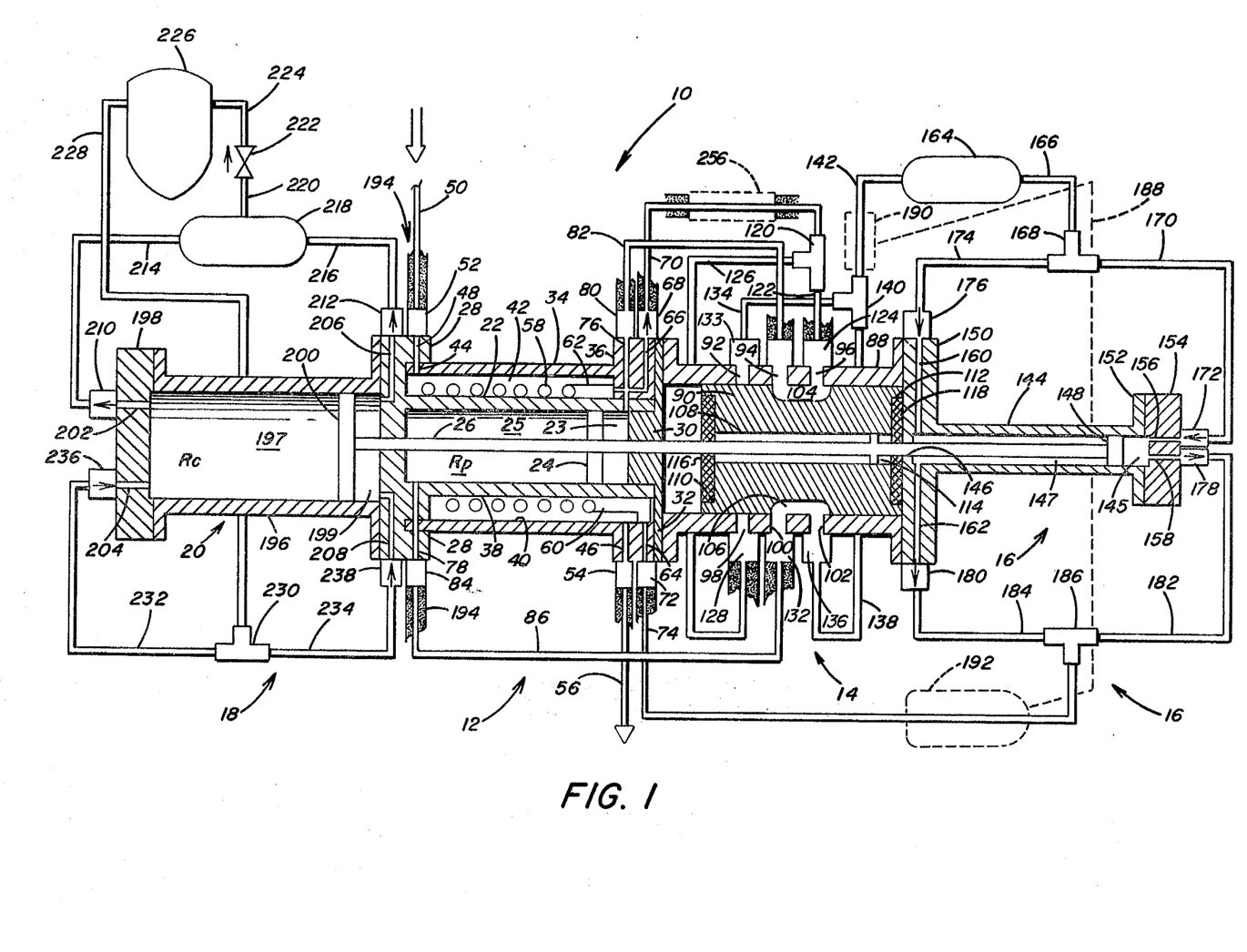
FIG. 1 is a schematic, sectional view of a modified Rankine-Sterling cycle engine of this invention shown in operative relation with a refrigeration or air conditioning system.
Figure 1A:
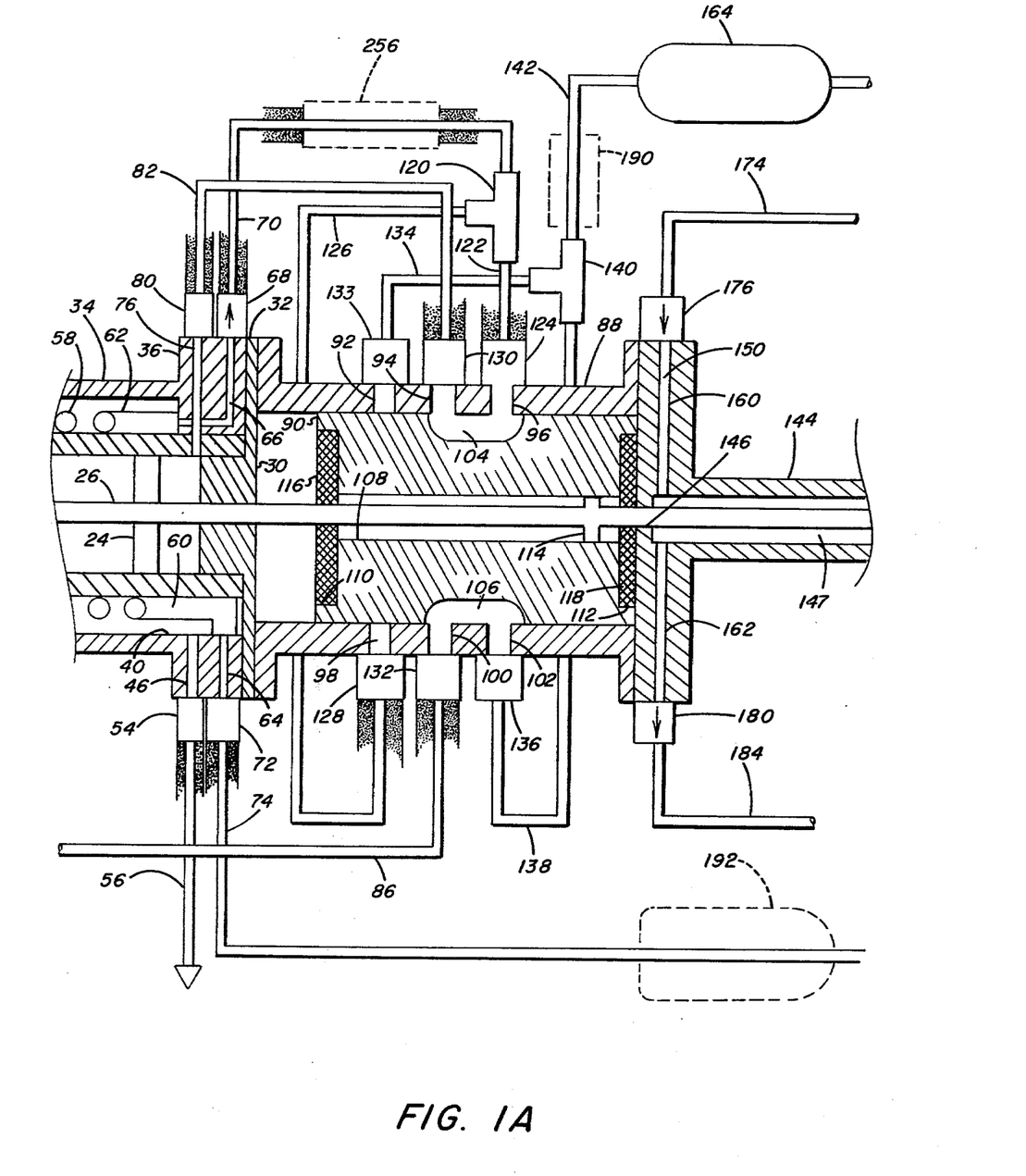
FIG. 1A is an enlarged, schematic, sectional view of the valve portion of the modified Rankine-Sterling cycle engine of this invention.

Referring to the drawings and, in particular, FIGS. 1 and 1A there is illustrated one embodiment of the present invention that includes a modified Rankine-Sterling cycle engine generally designated by the reference numeral 10. Engine 10 basically includes three assemblies which, as shown, include a power assembly 12, a valve assembly 14 and a feed pump assembly 16. In the particular embodiment illustrated in FIG. 1, engine 10 is being used to provide power to an operating assembly 18 which, in this case, is a refrigeration or air conditioning system that includes a compressor 20 posiitoned or mounted on the front end of engine 10.

With particular reference to power assembly 12, included therein are a power cylinder 22, a power piston 24 mounted for reciprocating movement within power cylinder 22 and a shaft 26 connected to power piston 24 which, for reasons that will become more apparent hereinafter, extends through both ends of power cylinder 22. Power cylinder 22, as shown, includes a forwardly closed cylinder (except for the bore for shaft 26) with an integral, outwardly extending annular flange portion 28 at its forward end. Closing the rear end of power cylinder 22 is a disc member 30, also provided with an integral, outwardly extending annular flange portion 32. Concentrically surrounding power cylinder 22, between flange portions 28 and 32, is a cylindrical sleeve member 34 having an annular flange portion 36 at its rear end. Cylindrical sleeve number 34 provides, between its inner wall portions 38 and the outer wall portions 40 of power cylinder 22, a heat exchanger chamber 42.

Heat exchanger chamber 42 or, more particularly, sleeve member 34 is suitably provided with an inlet opening or channel 44 at its forward end and an outlet opening or channel 46 in flange portion 36 at its rearward end for the purpose of conveying a heated carrier liquid through chamber 42. As shown, an aligned aperture or channel 48 extends through cylinder flange portion 28 and provides communication with inlet channel 44 from carrier liquid inlet conduit 50 which, in turn, is secured by a suitable fitting 52 in communication with channel 48. A similar fitting 54 and carrier liquid outlet conduit 56 are secured in communication with outlet channel 46 at the rear end of power cylinder 22.

Disposed within heat exchanger chamber 42 in generally concentric, surrounding relation with power cylinder 22 is an expansion coil 58. Expansion coil 58 has an inlet end portion 60 and an outlet end portion 62 suitably connected to corresponding inlet and outlet openings or channels 64 and 66, respectively, provided in flange portion 36 of sleeve member 34. As illustrated in greater detail in FIG. 1A outlet channel 66 is connected to a one-way outlet valve 68 and an outlet conduit 70, and inlet channel 64 is connected to a fitting 72 and an inlet conduit 74 for the purpose of conveying a power refrigerant to and from expansion coil 58. One-way valve 68 and subsequently mentioned one-way valves permit flow only in the direction of the arrow, as shown.

Inlet-outlet apertures or channels 76 and 78 are provided for the purpose of alternately admitting and releasing the power refrigerant to or from chamber 23 and chamber 25 on the right side and the left, side, respectively, of power piston 24. Specifically, channel 76 extends through rear flange 36 of sleeve 34 and an aligned rearward wall portion of power cylinder 22 and connects to a fitting 80 and an inlet-outlet conduit 82. Channel 78, on the other hand, extends through forward flange 28 of power cylinder 22 and an aligned forward end portion of sleeve 34 and similarly connects to a fitting 84 and an inlet-outlet conduit 86.

Valve assembly 14, as shown in FIGS. 1 and 1A, is mounted in axial alignment with and on the rear of power assembly 12. Mounting bolts, nuts, insulators, sealants, gaskets, etc. are not shown in the drawings for convenience, but are well within the skill of the art. With specific reference to FIG. 1A, valve assembly 14 includes a cylindrical valve housing 88 having an annular flange on both ends and a valve piston 90 mounted for reciprocating movement therein. For balance and convenience, valve housing 88 is provided, as shown, with longitudinally aligned and evenly spaced apertures or channels 92, 94 and 96 through a central portion of its cylindrical wall and, diametrically opposite thereto, longitudinaly aligned and evenly spaced apertures or channels 98, 100 and 102.

Valve piston 90 is provided with a groove, chamber or the like 104 that in a rearward position of valve piston 90 bridges or provides communication between channels 94 and 96 and in a forward position provides communication between channels 92 and 94. Similarly, valve piston 90 is provided with a diametrically opposite groove, chamber or the like 106 that in the rearward position of valve piston 90 bridges or provides communication between channels 100 and 102 and in said forward position provides communication between channels 98 and 100.

Valve piston 90 is further provided with an axial bore 108, a cylindrical countersink 110 in its forward end and a cylindrical countersink 112 in its rearward end. As shown, shaft 26 extends through the rear end of power cylinder 22, through axial bore 108 in valve piston 90 and beyond the longitudinal extend of valve housing 88. A portion of shaft 26 residing in bore 108 is provided with an annular shoulder 114 which, as shown, may be integral with shaft 26. A shoulder abutment disc 116 is securely mounted in coutersink 110 and a similar shoulder abutment disc 118 is securely mounted in countersink 112. With this arrangement, as shaft 26 is caused to move to the left, as shown in FIG. 1, shoulder 114 moves to the left through bore 108 until it contacts abutment disc 116. Further leftward movement of shaft 26 moves valve piston 90 to the left so that the shown communication between channels 94 and 96 and channels 100 and 102 is interrupted and communication is established between channels 92 and 94 and channels 98 and 100. Conversely, return movement of shaft 26 to the right moves shoulder 114 to the right against abutment disc 118 to return valve piston 90 to the position shown in FIG. 1.

For reasons that will be clearer hereinafter, conduit 70 as illustrated in FIG. 1A is connected to a "tee" fitting 120 and the other two branches of fitting 120 are connected respectively, by conduit 122 and fitting 124 to valve housing channel 96 and by conduit 126 and fitting 128 to valve housing channel 98. Conduit 82, as shown, is connected by fitting 130 to valve housing channel 94. Conduit 86, in turn, is connected by fitting 132 to valve housing channel 100. Finally, valve housing channel 92 is connected by a fitting 133 to a conduit 134 and valve housing channel 102 is connected by a fitting 136 to a conduit 138. Conduits 134 and 138 join at "tee" fitting 140 and a conduit 142 extends from "tee" fitting 140 for connection, as will shortly be described, with a condenser associated with feed pump assembly 16.

Feed pump assembly 16, as shown in FIG. 1, is mounted in axial alignment with and on the rear end of valve assembly 14. Feed pump assembly 16 includes a feed pump cylinder 144 having its formward end closed except for a stepped down bore 146 to permit passage of shaft 26 therethrough. A feed pump piston 148 is secured to the rearward end of shaft 26 and is mounted for reciprocating movement in cylinder 144. An integral, annular flange 150 is provided on the forward end of cylinder 144, and an integral, annular flange 152 is provided on the rear end of cylinder 144. Secured to rear annular flange 152 is a cylinder closure cap 154. Closure cap 154 is provided with an inlet aperture or channel 156 and an outlet aperture or channel 158, each communicating with the chamber 145 on the right or rearward side of feed pump piston 148. Also, an inlet aperture or channel 160 and an outlet aperture or channel 162 are provided in flange 150 and each provides communication with the chamber 147 on the left or forward side of feed pump piston 148.

A power refrigerant condenser 164 is shown connected at its inlet to conduit 142 and is provided with an outlet conduit 166 that connects with "tee" fitting 168. A conduit 170 extends from "tee" fitting 168 and is connected to inlet channel 156 through a one-way inlet valve 172. Similarly, a conduit 174 extends from "tee" fitting 168 and is connected to inlet channel 160 through a one-way inlet valve 176. One-way outlet valves 178 and 180 are connected, respectively, to outlet channels 158 and 162 of the feed pump. As shown, conduits 182 and 184, in turn, connect valves 178 and 180 to a "tee" fitting 186 which is also connected to the inlet conduit 74 for the expansion coil 58. Also indicated schematically in phantom in FIG. 1 is a heat regenerator system 188, of any desired construction, that includes a heat extractor device 190 operatively associated with the inlet conduit 142 to condenser 164 to extract heat from the power refrigerant before it reaches the condenser 164 and which, in turn, is operatively connected to a heat transfer device 192 operatively associated with the inlet conduit 74 to expansion coil 58 to transfer the extracted heat to the power refrigerant before it enters the expansion coil 58. Suitable pipe or conduit insulation, generally designated by the numeral 194, is provided, as required, around the various conduits disclosed.

As stated above, the primary thrust of this invention is to utilize or conserve waste heat by converting it into useful work. A typical example of a notorious waste of heat energy is in the operation of an automobile wherein approximately 75 percent of the energy supplied is released as heat to the atmosphere. The energy balance of a conventional gasoline powered automobile engine with a compression ratio of 9:1, running at 2500 RPM, may be estimated as follows:

| Brake Work | 25% |
| Heat to Coolant | 20% |
| Exhaust Heat and Other Losses | 55% |
| Engine Friction (Part of above) | 5% |

An example of the energy release may be shown by the example of an automobile operating at 55 MPH wherein, on level road, a brake power of about 30 is required. Further, a brake specific fuel consumption of 0.55 may be estimated for gasoline with 20,000 B/lb heat value. This provides the following energy release results:

| Total Fuel Energy Release | 330,000 B/hr. |
| Brake Work | 82,500 B/hr. |
| Exhaust Heat and Other Losses | 189,500 B/hr. |
| Heat to Coolant | 60,000 B/hr. |

Thus, for the case in point, about 9 gals. of cooling water per minute may be circulated through the cooling system with a temperature gain of about 15° F. across the engine. This cooling water, then, can be the heated carrier liquid providing a waste heat energy source for operation of a typical apparatus of this invention. An additional waste heat source can be provided by the exhaust heat in a manner hereinafter described.

In FIG. 1, as aforesaid, there is shown an operating assembly 18 which, in this case, is an air conditioning system for an automobile and includes a compressor 20 positioned or mounted on the front end of engine 10. Compressor 20 includes a cylindrical compressor housing 196, having an end cap 198, and a compressor piston 200 secured to the forward end of shaft 26 and mounted for reciprocating movement in housing 196. Compressor end cap 198 is provided with a pair of apertures or channels 202 and 204 communicating with the chamber 197 on forward or left side of compressor piston 200. A pair of apertures or channels 206 and 208 are also provided in power cylinder flange 28 to provide communication with the chamber 199 on rearward or right side of compressor piston 200. As shown, one-way outlet valves 210 and 212 are connected to channels 202 and 206 and conduits 214 and 216 provide an inter-connection between these valves and separate inlets to a condenser 218. The outlet of condenser 218 is connected by conduit 220 to the inlet of an expansion valve 222. The expansion valve 222, in turn, is connected by conduit 224 to the inlet of an evaporator 226. Finally, the outlet of evaporator 226 is connected by conduit 228 to a "tee" fitting 230 having separate conduits 232 and 234 connected through one-way inlet valves 236 and 238 to channels 204 and 208, respectively.

The operation of the modified Rankine-Sterling cycle engine of FIG. 1 will now be described in connection with air conditioning an automobile using the waste heat transferred to the engine coolant as the source of energy for its operation. Although both the power cycle and the cooling cycle progress in operation simultaneously, because of the common shaft 26, it is desirable to discuss each cycle independently.

Starting with the power cycle, with the valve piston in the extreme right position, the upper valve chamber 104 connects the right power chamber 23 to the high pressure source originating in the expansion coil 58. At the same time, the lower valve chamber 106 connects the left power chamber 25 to the pressure drop source taking place in condenser 164. When the heated carrier liquid or heated coolant from the internal combustion engine (not shown) begins to circulate through heat exchanger chamber 42, it heats expansion coil 58 and vaporizes the power refrigerant Rp contained therein, thus creating a high pressure build-up. It is important to note that this is a continuous operation as long as the system is in operation. The power refrigerant vapors, forcing their way through the one-way outlet valve 68, upper valve chamber 104 and into the right power chamber 23, start building a high pressure region. The power piston 24 starts traveling to the left, forcing the power refrigerant vapors in the left power chamber 25 through the lower valve chamber 106 and into condenser 164. Some heat transfer or heat extraction from the power refrigerant vapors takes place in the heat extractor device 190, before they enter condenser 164, where power refrigerant vapors are condensed thus creating a low pressure region.

Feed pump piston 148 travels to the left simultaneously with power piston 24 since both are mounted on common shaft 26. This creates a pressure drop in the right feed pump chamber 145 which will draw in the condensed power refrigerant from condenser 164 through the one-way inlet valve 172. At the same time, liquid power refrigerant in the left feed pump chamber 147 is forced out through the one-way outlet valve 180 into the heat transfer device 192 where the power refrigerant picks up some heat and then enters into the expansion coil again.

When the common shaft's shoulder 114, traveling to the left, rides against the left abutment disc 116, it drives the valve piston 90 to the extreme left position. This switches the upper valve chamber 104 from the expansion coil line (66, 68, 70, 120, 122, 124, 96) to the condenser line (92, 132, 134, 140, 142). Also the lower valve chamber 106 switches from the condenser line (102, 136, 138, 140, 142) to the expansion coil line (98, 128, 126, 120, 70, 68, 66). In other words, the high pressure power refrigerant vapors from the expansion coil will start flowing to the left power chamber 25 building up a high pressure region to the left side of the power piston 24. At the same time, the right power chamber 23 is connected to the condenser 164, which is a low pressure region. The power piston 24 will start traveling to the right, at which point, the first half of the power cycle ends and the second half of the cycle begins.

An identical switch-over takes place in the feed pump chambers. The liquid power refrigerant from condenser 164 enters feed pump chamber 147 through the one-way inlet valve 176, while power refrigerant in chamber 145 is forced out through the one-way outlet valve 178 back into the expansion coil again. The cycle will be completed when the common shaft's shoulder 114, riding against the right abutment disc 118 drives the valve piston 90 back to extreme right position again.

Turning now to the cooling cycle, as the compressor piston 200 travels to the left, by reasons of its being secured to common shaft 26, a high pressure region is created in the left compressor chamber 197 and another low pressure region is created in the right compressor chamber 199. Therefore, while the cooling refrigerant Rc in chamber 197 is forced out through one-way outlet valve 210 to condenser 218, cooling refrigerant from evaporator 226 is being sucked into chamber 199 through one-way inlet valve 238. This creates a pressure drop across expansion valve 222. Therefore, an evaporation process takes place across the expansion valve 222 causing a temperature drop in evaporator 226.

As the compressor piston 200 reverses direction and starts traveling to the right, chamber 199 becomes the region of high pressure and chamber 197 becomes the region of low pressure. The rest of the cycle is deemed to be self-explanatory on the basis of the known operation of a conventional vapor compression cooling system.

Suitable organic power refrigerants that may be used include R-114, R-22, R-142B and others. Suitable organic cooling refrigerants that may be used include R-22, R-12 and others. Moreover, the power refrigerant and the power coolant could be of the same fluid and, in the case of the availability of a high temperature source of 400° F. or above, water can be used as the power fluid.

Figure 2:
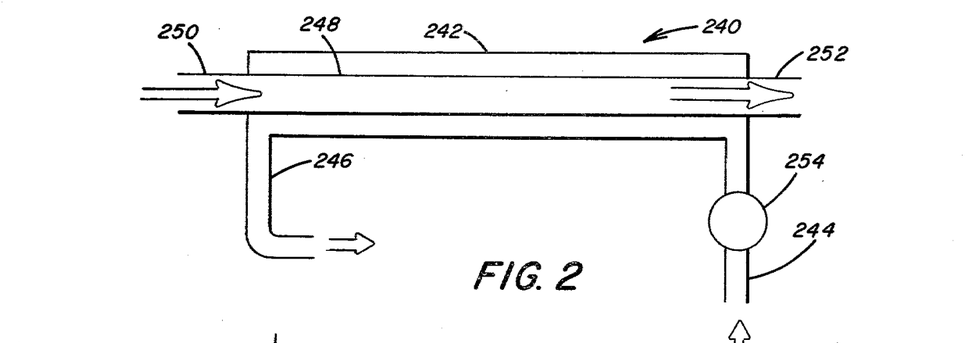
FIG. 2 is a schematic view of a heat exchanger for exhaust gases that can optionally be employed in carrying out the principles of this invention.

Referring now to FIG. 2, there is shown an alternative means to the use of the liquid engine coolant for transferring waste heat from an internal combustion to a carrier liquid for use with this invention. As shown a suitable heat exchanger 240 includes a heat exchanger chamber 242 provided with an inlet portion 244 and an outlet portion 246 to pass a suitable carrier liquid therethrough. Traversing through heat exchanger chamber 242 is a pipe or conduit 248, of any desired configuration, having an inlet portion 250 and an outlet portion 252 for the purpose of conveying exhaust gases, in heat transfer relationship, with the carrier liquid passing through heat exchanger chamber 242. As shown, a fluid pump 254 may desirably be interposed in inlet portion 244 of the heat exchanger chamber 242, for the purpose of enhancing flow of the carrier liquid if convective flow alone is not adequate or practical. In accordance with this alternative arrangement, for example, outlet portion 246 may be connected to the inlet conduit 50 and inlet portion 244 may be connected to the outlet conduit 56 of the modified Rankine-Sterling engine 10 of FIG. 1.

Figure 3:
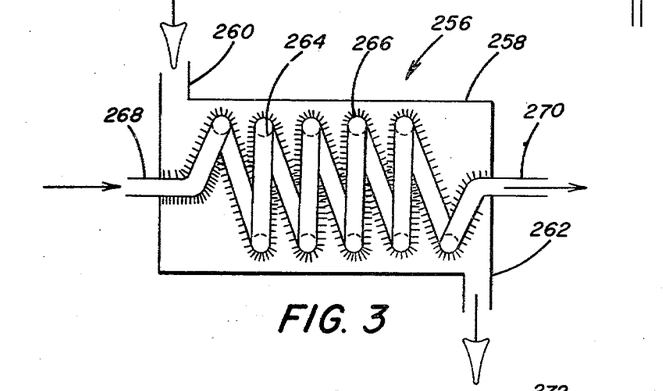
FIG. 3 is a schematic view of a superheating device or attachment that can optionally be employed with the modified Rankine-Sterling cycle engine of this invention.

Shown in FIG. 3 is an additional adjunct of this invention. Illustrated is a superheater 256, that may optionally be interposed in conduit 70, as shown in phantom in FIG. 1, to enhance the operation of the modified Rankine-Sterling engine 10. Superheater 256 includes a superheater chamber 258 provided with an inlet portion 260 and an outlet portion 262 to pass exhaust gases therethrough. Traversing through superheater chamber 258 is a coil 264 provided with fins 266 to enhance heat transfer to coil 264. Coil 264 is provided with an inlet portion 268 and an outlet portion 270 for the purpose of conveying power refrigerant Rp, in heat transfer relationship with the exhaust gases passing through superheater chamber 258. Accordingly, waste heat may be utilized from exhaust gases, as well as from engine coolant, to improve waste heat utilization for the purpose of this invention.

Figure 4:
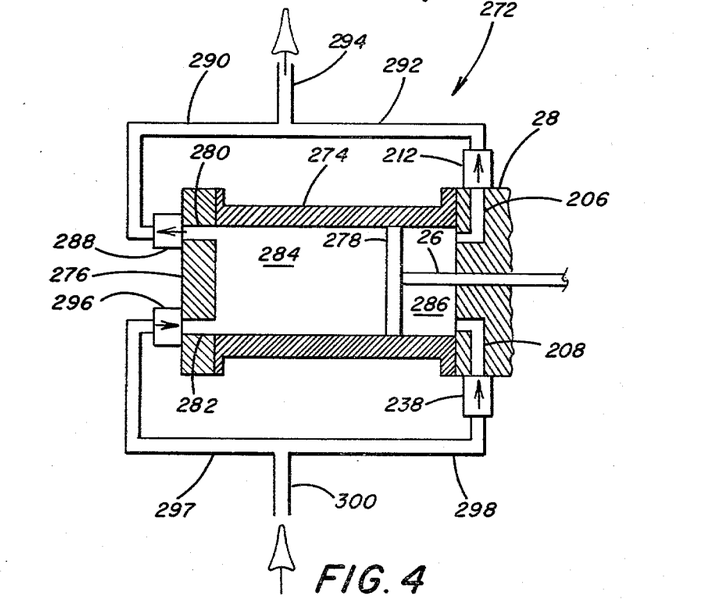
FIG. 4 is a schematic view, partly in section and partly broken away, of a fluid pump and is illustrative of other mechanical devices than a compressor that may be operatively attached to the modified Rankine-Sterling cycle engine of this invention.

Illustrated in FIG. 4 is a fluid pump 272 which, by way of example, may be utilized as an alternative mechanical device on the engine 10 of this invention, in lieu of the compressor 20 of the disclosed refrigeration or air conditioning system. Fluid pump 272 includes a fluid pump housing 274, having an end cap 276, and a fluid pump piston 278 secured to the forward end of shaft 26 and mounted for reciprocating movement in housing 274. Fluid pump end cap 276 is provided with a pair of apertures or channels 280 and 282 communicating with the chamber 284 on the forward or left side of fluid pump piston 278. As aforesaid, power cylinder flange 28 of engine 10 is provided with a pair of apertures or channels 206 and 208 to provide communication with the chamber 286 on the rearward or right side of fluid pump piston 278. As shown, one-way outlet valves 288 and 212 are connected to channels 280 and 206 and outlet conduits 290 and 292 provide an interconnection between these valves and a common fluid outlet conduit 294. Similarly, one-way inlet valves 296 and 238 are connected to channels 282 and 208 to provide communication with chambers 284 and 286 from inlet conduits 297 and 298 which, as shown, are connected to common fluid inlet conduit 300. Thus, fluid entering through fluid inlet conduit 300 will be pumped by operation of engine 10 through fluid outlet conduit 294.

Figure 5:
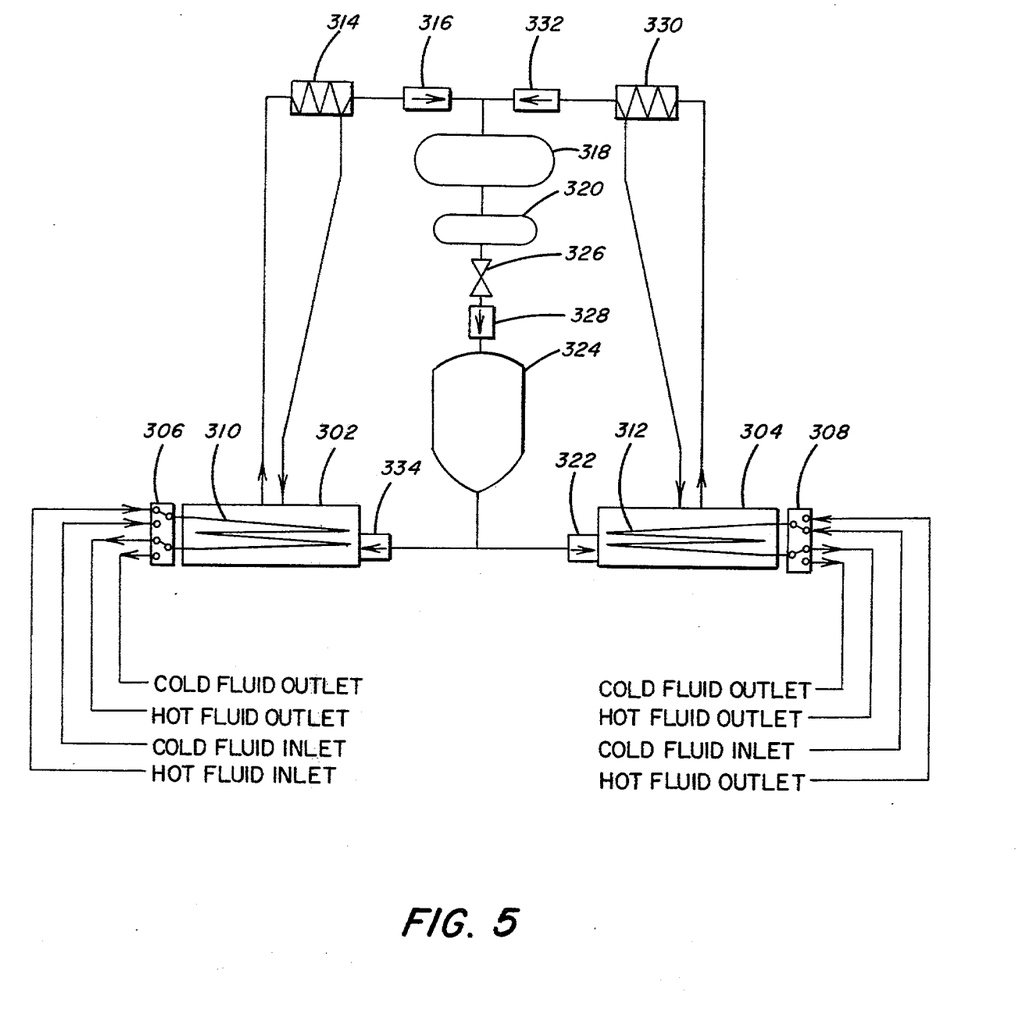
FIG. 5 is a schematic representation of a preferrred dual absorption generator refrigeration or air conditioning system of this invention.

Referring to FIG. 5 there is illustrated the embodiment of the present invention that includes a dual absorption generator system for cooling and air conditioning. The heat source required to drive this system is one of low temperature, 170° F. or higher and, accordingly, the system is particularly suitable for operation by a heated carrier liquid, such as the engine coolant of an internal combustion engine. More particularly, the 66,000 B/hr., shown above, for coolant dissipation is representative of the amount of heat available from a waste heat source to energize an absorption type environmental system for an automobile interior. Since the input/output relationship for space cooling equipment working on the absorption principle is found to be about 0.60 to 0.75, this means that for 66,000 B/hr. coolant heat available, a capacity of 3–4 tons of cooling is possible.

Two generators are used in the system of this invention. In the first half cycle, one of the generators operates as a refrigerant generator while the other operates as a refrigerant absorber. The two generators will alternate every half cycle whereby one acts as a generator and the other as an absorber. The system's capacity is very broad (5,000 B/hr. and up). It is also extremely compact and has no moving parts other than a single control valve.

Absorption-disorption systems use different kinds of absorbent-disorbent pairs. Some examples are: water-ammonia, lithium bromide-water and lithium bromide-methanol. Each pair has its own characteristics which are suitable for certain usages. Any of the above pairs can be used in the dual generator system of this invention, however, the water-ammonia will be used for illustration.

Referring to FIG. 5, generator 302 is filled with an aqua ammonia solution of concentration $C_1$ and generator 304 is also filled with aqua ammonia solution of concentration $C_2$, where $C_1$ is of higher concentration than $C_2$. Control valves 306 and 308 are synchronized to control the heating and cooling cycle of both generators 302 and 304. When hot coolant or hot fluids from an internal combustion engine (not shown) circulates through one of the generators, cold fluid, such as from a radiator source, not shown, will be circulating through the other.

Starting the first half cycle, hot fluid is circulated through coil 310 of generator 302 and cold fluid is circulated through coil 312 of generator 304, such that generator 302 is acting as a generator while generator 304 is acting as an absorber. Adding heat to the ammonia-water solution in generator 302 will force ammonia vapor and some water vapor out of the solution under high pressure. Ammonia and water vapors will flow to rectifier 314, where water vapors will be condensed and drip back to generator 302. The anhydrous ammonia vapor will pass through one-way valve 316 and will be condensed in condenser 318. It is then passed to receiver 320 as liquid ammonia.

Simultaneously, a cooled fluid is being circulated through coil 312 of generator 304, thereby reducing the temperature of the ammonia-water solution. This results in a pressure drop, thus creating a low pressure region which is far below the pressure in reservoir or receiver 320. With the one-way inlet valve 322 into generator 304, the pressure in the evaporator 324 will eventually equalize with the low pressure region in generator 304. In other words, a high pressure drop occurs across expansion valve 326 and one-way pressure control valve 328.

The expansion valve 326 and one-way pressure control valve 328 are connected in series to regulate the anhydrous liquid ammonia flow to the evaporator 324. When both are open, the anhydrous liquid ammonia will flow into the evaporator 324, where instant evaporation takes place. As a result, the evaporator temperature drops.

The anhydrous ammonia vapors will be drawn into the low pressure region in generator 304 and then absorbed by the solution. The process continues until the ammonia concentration in generator 302 decreases to $C_2$. Simultaneously, the ammonia concentration in generator 304 increases to $C_1$. This will complete the first half of the cycle.

The second half of the cycle starts when control valves 306 and 308 reverse the hot and cold fluid circulation through generators 302 and 304. This process is identical to the process of the first half cycle with the direction reversed. Generator 304 operates as a generator while generator 302 operates as an absorber. Therefore, the ammonia flow will be from generator 304 to rectifier 330, through one-way valve 332, condenser 318, reservoir 320, expansion valve 326, one-way pressure control valve 328, evaporator 324, one-way inlet valve 334, back to generator 302. This process will continue until the ammonia concentration in generator 302 reaches $C_1$ and the ammonia concentration in generator 304 drops to $C_2$. Thus the cycle is completed.

According to the provisions of the Patent Statutes, I have explained the principle, preferred construction and mode of operation of my invention and have illustrated and described what I now consider to represent its best emboidments. However, it should be understood that, within the scope of the appended claims, the invention may be practiced otherwise than as specifically illustrated and described.

I claim:

1. Apparatus for converting waste heat from an internal combustion engine into useful energy comprising, means for conveying a carrier liquid heated by waste heat from an internal combustion engine, heat exchanger means for transferring heat from the heated carrier liquid to a refrigerant, said heat exchanger means being operable to pressurize the refrigerant by heating the refrigerant with the heat energy extracted from the heated carrier liquid to the temperature of vaporization of the refrigerant, means for performing work with the pressurized refrigerant including a power piston-cylinder means having shaft means connected to said power piston and extending axially through a first end of said power cylinder, said power piston-cylinder means being operable by admitting the pressurized refrigerant on one side of said power piston to move said power piston and said shaft means in one direction and by admitting the pressurized refrigerant on the other side of said power piston to move said power piston and said shaft means in the opposite direction, said power piston-cylinder means being circumferentially enclosed by said heat exchanger means, valve means for alternately admitting the pressurized refrigerant in timed sequence into said power cylinder and to said one side and then said other side of said power piston and in opposite timed sequence to alternately release the refrigerant from said power cylinder on the side of said power piston opposite that side confining the pressurized refrigerant, condenser means for receiving the vaporized refrigerant under pressure, said condenser means being operable to condense the vaporized refrigerant to form liquid refrigerant and to receive the refrigerant from said power cylinder, shaft means extending axially through the second end of said power cylinder for connecting said power piston to said valve means, said valve means including a valve housing, a valve piston mounted for reciprocation within said valve housing and an axial bore through said valve piston, said valve housing being mounted on said power piston-cylinder means so that said shaft means extending axially through the second end of said power cylinder extends into said axial bore, a shoulder on said shaft and located within said axial bore, means on said valve piston to move said valve piston when said shoulder comes into contact therewith, openings in said valve housing communicating with openings in said valve piston to admit the refrigerant to said power cylinder and release the refrigerant from said power cylinder, expansion means for drawing the liquid refrigerant from said condenser means, said expansion means being operable to subject the liquid refrigerant to a decreased pressure, and evaporation means associated with said expansion means for subjecting the liquid refrigerant to an evaporation process so that the liquid refrigerant evaporates in said evaporation means thereby reducing the temperature in said evaporation means.

2. Apparatus as set forth in claim 1 in which, said heat exchanger means includes an expansion coil having an inlet and an outlet for conveying the refrigerant therethrough, and a chamber surrounding said expansion coil and having an inlet and an outlet for conveying the heated carrier liquid therethrough.

3. Apparatus as set forth in claim 1 which includes, said condenser means being operable to receive the refrigerant released from said power cylinder.

4. Apparatus as set forth in claim 3 which includes, heat transfer means interposed between the inlet of said condenser means and said power cylinder for extracting heat from the refrigerant released from said power cylinder and received by said condenser means.

5. Apparatus as set forth in claim 3 which includes, refrigerant feed pump means for drawing condensed refrigerant from said condenser means and delivering the condensed refrigerant to said inlet of said expansion coil.

6. Apparatus as set forth in claim 5 which includes, heat transfer means interposed between the outlet of said feed pump means and said heat exchanger means for transferring heat to the condensed refrigerant delivered to said heat exchanger means.

7. Apparatus as set forth in claim 1 which includes, shaft means extending axially from said shoulder through said valve means and connected to refrigerant feed pump means for drawing condensed refrigerant from said condenser and for delivering the condensed refrigerant to said heat exchanger means.

8. A pparatus as set forth in claim 7 in which, said refrigerant feed pump means includes a feed pump housing and a feed pump piston mounted for reciprocation within said feed pump housing, said feed pump piston being connected to said shaft means extending from said shoulder through said valve means, a one-way inlet valve and a one-way outlet valve disposed in operative communication with one side of said feed pump piston, and a one-way inlet valve and a one-way outlet valve disposed in operative communication with the other side of said feed pump piston.

9. Apparatus as set forth in claim 8 which includes, a power receiving piston-cylinder means operatively connected to said power piston-cylinder means, and said shaft means extending through a first end of said power cylinder being connected to said power receiving piston-cylinder means.

10. Apparatus as set forth in claim 9 in which, said power receiving piston-cylinder means includes a refrigerant compressor for air cooling apparatus.

11. Apparatus as set forth in claim 9 in which, said power receiving piston-cylinder means includes a fluid pump.

12. Apparatus as set forth in claim 1 in which, said carrier liquid includes coolant taken from the cooling jacket of said internal combustion engine.

13. Apparatus as set forth in claim 1 which includes, an exhaust heat exchanger to transfer heat from the exhaust of said internal combustion engine to said carrier liquid.

14. Apparatus as set forth in claim 1 which includes, an exhaust heat exchanger to transfer heat from the exhaust of said internal combustion engine to the refrigerant to furthe pressurize the refrigerant.

15. Ajpparatus as set forth in claim 1 in which, said heat exchanger means includes a pair of generators, said generators each including coil means for conveying therethrough either said heated carrier liquid or a cooling fluid and a chamber surrounding said coil means, and said chamber having an inlet and an outlet for conveying the refrigerant therethrough.

16. Apparatus as set forth in claim 15 which includes, rectifier means connected to said outlet of each said generator chambers for receiving the refrigerant therefrom, a one-way valve operatively connected to said refrigerant outlet from each rectifier means, said condenser means being operatively connected to said refrigerant outlet of both one-way valves, a receiver operatively connected to said refrigerant outlet, said expansion means including an expansion valve operatively connected to said refrigerant outlet, a one-way pressure control valve operatively connected to said expansion valve, said evaporator means being operatively connected to said one-way pressure control valve to provide said means for performing work, and a pair of one-way valves operatively connected to said evaporator means, each of said last mentioned pair of one-way valves being disposed in operative communication with said inlet of one of said generator chambers.

17. Apparatus as set forth in claim 16 in which, said coil means of each of said generators includes a single coil having an inlet and an outlet, and control valve means operatively connected to said inlet and outlet of each said coil means for conveying the heated carrier liquid through one said coil means while conveying the cooling fluid through the other said coil means and in timed sequence reversing the operation and conveying the heated carrier liquid through said other said coil means while conveying the cooling fluid through said one said coil means.

18. A method for converting waste heat from an internal combustion engine into useful energy comprising, conveying a carrier liquid heated by waste heat from an internal combustion engine, transferring heat from the heated carrier liquid to a refrigerant, heating the refrigerant with the heat energy extracted from the heated carrier liquid to the temperature of vaporization of the refrigerant, pressurizing the refrigerant by heating the refrigerant, conveying the pressurized refrigerant to one side of a power piston-cylinder means to move the power piston-cylinder means in a first direction and to the opposite side of the power piston-cylinder means to move the power piston-cylinder means in an opposite direction, alternately admitting the pressurized refrigerant in timed sequence to the opposite sides of the power piston-cylinder means, alternately releasing the pressurized refrigerant in opposite timed sequence from the power piston-cylinder means on the side thereof opposite that side admitting the pressurized refrigerant, condensing the vaporized refrigerant to form liquid refrigerant, conveying the liquid refrigerant through an expansion valve and thereby decreasing the pressure of the liquid refrigerant, and evaporating the liquid refrigerant to produce a reduction in the temperature thereof.

19. Apparatus for converting waste heat from an internal combustion engine into useful energy comprising:

means for conveying a carrier liquid heated by waste heat from an internal combustion engine, heat exchanger means for transferring heat from the heated carrier liquid to a refrigerant, said heat exchanger means being operable to pressurize the refrigerant by heating the refrigerant with the heat energy extracted from the heated carrier liquid to the temperature of vaporization of the refrigerant, power piston-cylinder means for performing work with the prssurized refrigerant, valve means for alternately admitting the pressurized refrigerant in timed sequence to opposite sides of said power-piston cylinder means and in opposite timed sequences to alternately release the pressurized refrigerant from said power piston-cylinder means on the side thereof opposite that side confining the pressurized refrigerant, shaft means for connecting said power piston-cylinder means to said valve means, said valve means including a valve housing, a valve piston mounted for reciprocation within said valve housing and an axial bore through said valve piston, said valve housing being mounted on said power piston-cylinder means so that said shaft means extends into said axial bore, a shoulder on said shaft means, means on said valve piston to move said valve piston when said shoulder comes into contact therewith, openings in said valve housing communicating with openings in said valve piston to admit the refrigerant to said power piston-cylinder means and release the refrigerant from said power piston-cylinder means, condenser means for receiving the vaporized refrigerant under pressure, said condenser means being operable to condense the vaporized refrigerant to form liquid refrigerant, refrigerant feed pump means for drawing condensed refrigerant from said condenser means and for delivering the condensed refrigerant to said heat exchanger means, said means extending axially from said valve means and connected to said refrigerant feed pump means, expansion means for drawing the liquid refrigerant from said condenser means, said expansion means being operable to subject the liquid refrigerant to a decreased pressure, and evaporation means associated with said expansion means for subjecting the liquid refrigerant to an evaporation process so that the liquid refrigerant evaporates in said evaporation means thereby reducing the temperature in said evaporation means.

20. Apparatus as set forth in claim 19 in which, said refrigerant feed pump means includes a feed pump housing and a feed pump piston mounted for reciprocation within said feed pump housing, said feed pump piston being connected to said shaft means extending from said shoulder through said valve means, a one-way inlet valve and a one-way outlet valve disposed in operative communication with one side of said feed pump piston, and a one-way inlet valve and a one-way outlet valve disposed in operative communication with the other side of said feed pump piston.

21. Apparatus as set forth in claim 20 which includes, a power receiving piston-cylinder means operatively connected to said power piston-cylinder means, and said shaft means extending through a first end of said power cylinder being connected to said power receiving piston-cylinder means.

22. Apparatus as set forth in claim 21 in which, said power receiving piston-cylinder means includes a refrigerant compressor for air cooling apparatus.

23. Apparatus as set forth in claim 21 in which, said power receiving piston-cylinder means includes a fluid pump.

24. Apparatus as set forth in claim 19 in which, said carrier liquid includes coolant taken from the cooling jacket of said internal combustion engine.

25. Apparatus as set forth in claim 19 which includes, an exhaust heat exchanger to transfer heat from the exhaust of said internal combustion engine to said carrier liquid.

26. Apparatus as set forth in claim 19 which includes, an exhaust heat exchanger to transfer heat from the exhaust of said internal combustion engine to the refrigerant to further pressurize the refrigerant.

27. Apparatus for converting waste heat from an internal combustion engine into useful energy comprising:

means for conveying a carrier liquid heated by waste heat from an internal combustion engine, heat exchanger means for transferring heat from the heated carrier liquid to a refrigerant, said heat exchanger means being operable to pressurize the refrigerant by heating the refrigerant with the heat energy extracted from the heated carrier liquid to the temperature of vaporization of the refrigerant, said heat exchanger means includes a pair of generators, said geneators each including coil means for conveying therethrough either said heated carrier liquid or a cooling fluid and a chamber surrounding said coil means, said chamber having an inlet and and outlet for conveying the refrigerant therethrough, means for performing work with the pressurized refrigerant, condenser means for receiving the vaporized refrigerant under pressure, said condenser means being operable to condense the vaporized refrigerant to form liquid refrigerant, expansion means for drawing the liquid refrigerant from said condenser means, said expansion means being operable to subject the liquid refrigerant to a decreased pressure, and evaporation means associated with said expansion means for subjecting the liquid refrigerant to an evaporation process so that the liquid refrigerant evaporates in said evaporation means thereby reducing the temperature in said evaporation means.

28. Apparatus as set forth in claim 27 which includes, rectifier means connected to said outlet of each said generator chambers for receiving the refrigerant therefrom, a one-way valve operatively connected to said refrigerant outlet from each rectifier means, said condenser means being operatively connected to said refrigerant outlet of both one-way valves, a receiver operatively connected to said refrigerant outlet, said expansion means including an expansion valve operatively conncted to said refrigerant outlet, a one-way pressure control valve operatively connected to said expansion valve, said evaporator means being operatively connected to said one-way pressure control valve to provide said means for performing work, and a pair of one-way valves operatively connected to said evaporator means, each of said last mentioned pair of one-way valves being disposed in operative communication with said inlet of one of said generator chambers.

29. Apparatus as set forth in claim 28 in which, said coil means of each of said generators includes a single coil having an inlet and an outlet, and control valve means operatively connected to said inlet and outlet of each said coil means for conveying the heated carrier liquid through one said coil means while conveying the cooling fluid through the other said coil means and in timed sequence reversing the operation and conveying the heated carrier liquid through said other said coil means while conveying the cooling fluid through said one said coil means.

* * * * *